May 7, 1963  J. B. CODLIN  3,088,760
RIPPER SHANK KEY ASSEMBLY
Filed Feb. 7, 1961

Inventor
James B. Codlin
By Charles L. Schwab
Attorney

United States Patent Office 3,088,760
Patented May 7, 1963

3,088,760
RIPPER SHANK KEY ASSEMBLY
James B. Codlin, Lake Bluff, Ill., assignor to Allis-Chalmers Manufacturing Company, Milwaukee, Wis.
Filed Feb. 7, 1961, Ser. No. 87,578
5 Claims. (Cl. 287—54)

This invention relates to means for maintaining a ripper shank in its installed position on a carrier. More particularly, this invention relates to a removable keeper or key which locks the ripper shank to the carrier.

It is common practice in ripper construction to provide a ripper shank carrier which is of a box type construction. Vertically aligned openings are provided in the top and bottom walls of the transversely disposed carrier and the ripper shank is inserted upwardly through the vertically aligned openings. A forwardly opening notch is provided in the upper end of the ripper shank and this notch engages the top wall when a keeper or key is placed behind the upper rear of the shank. These keys have been of various types. Some are wedged in place by brute force. Others have merely been dropped into place, relying on gravity to hold them in the installed position. Other keys have complicated means for maintaining them in position.

It is desirable that a key be simple in construction, easy to remove and install so as to avoid delay in replacing ripper shanks. Also it is very important that the key be effectively maintained in its installed position so as to avoid its becoming lost. If the key works loose and drops out, the ripper shank will quite likely also drop out in which case considerable working time may be expended hunting for the lost shank.

It is an object of this invention to provide a removable ripper shank key assembly which remedies the deficiencies of prior art ripper shank keys and meets the requirements hereinbefore outlined.

It is a further object of this invention to provide a ripper shank key assembly which is simple in construction, is easy to install and remove and which positively holds the ripper shank in place.

It is a further object of this invention to provide a ripper shank key assembly with a manually deformable spring lock which is effective to releasably hold the key in a ripper shank locking position.

These and other objects and advantages of this invention will become apparent when the following description is read in conjunction with the drawings, in which.

Figure 1:
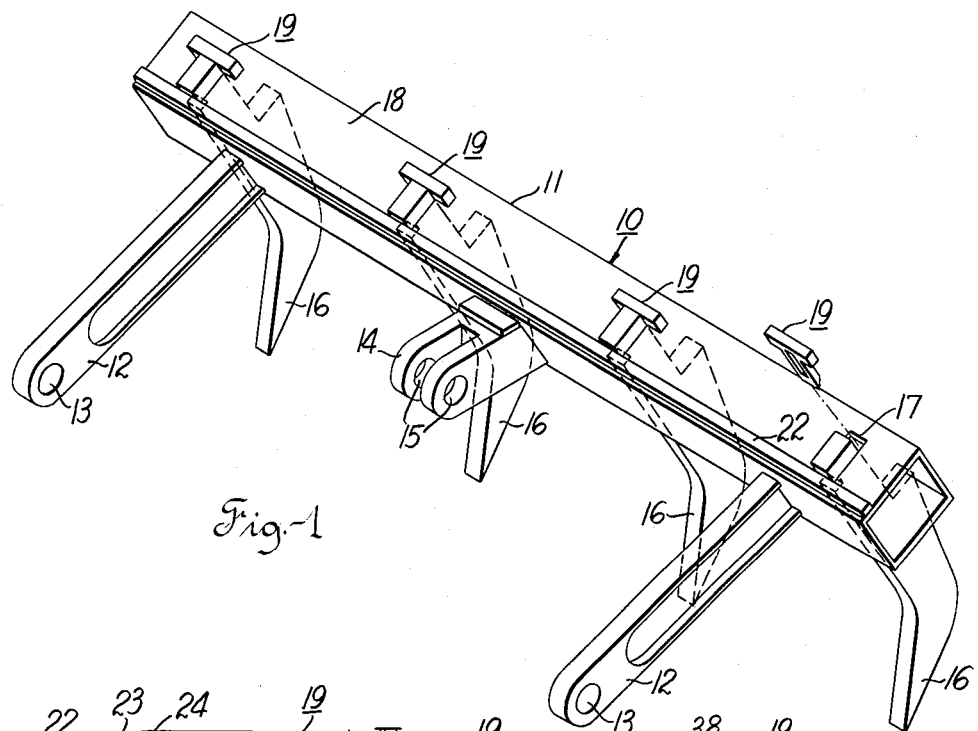
FIG. 1 shows a ripper in which key assemblies of this invention are installed.

Referring to FIG. 1, a perspective view of a ripper 10 is shown. The ripper 10 includes a carrier 11 disposed transversely of the direction in which the ripper is drawn by a tractor, not shown. The carrier 10 includes a pair of arms 12 extending forwardly with holes 13 for pivotal connection to the rear of a tractor. Also a bracket 15 with aligned holes 15 is rigidly secured to the carrier 11 for attachment to a hydraulic ram, not shown, employed to raise and lower the ripper with relation to the tractor. Four ripper shanks 16 are installed on the ripper carrier. The upper end of the shanks extend through an opening 17 in the upper wall 18 of the carrier 11. Each of the shanks 16 is maintained in an installed position by a key assembly 19.

Figures 2, 3, 4:
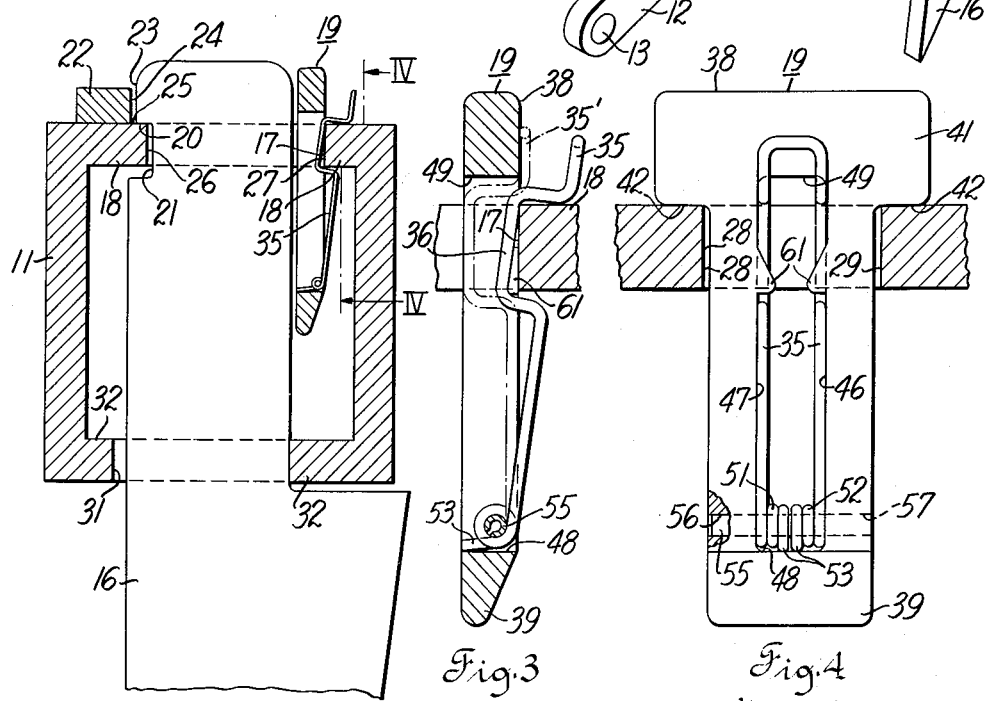
FIG. 2 is a section showing a ripper shank held in installed position by the key assembly of this invention.
FIG. 3 is an enlarged view of the key assembly shown in FIG. 2.
FIG. 4 is a view taken along the lines IV—IV of FIG. 2.

Referring now also to FIG. 2, it is seen that the ripper shank 16 has a notch 21 formed on the upper front side thereof. This notch 21 in the installed position of the ripper as shown in FIG. 2 engages the top wall 18 of the carrier 11. The top surface 20 of notch 21 and the exterior surface 25 of carrier 11 form complementary abutment surfaces preventing removal of the shank 16 when the key 19 is installed.

A reinforcing bar 22 is secured as by welding to the upper wall 18. The front side 23 of the ripper shank abuts against the rearward side 24 of the reinforcing bar 22 during ripping operation. The opening 17 is defined by a front surface 26, a rear surface 27, and side surfaces 28, 29 as shown in FIG. 4. The upper portion of the ripper shank 16 also extends upwardly through an opening 31 in the bottom wall 32 of the carrier 11. The upper end of the ripper shank 16 fits loosely enough in the openings 17 and 31 so as to facilitate installation and removal by hand. After the ripper shank is installed with the notch coacting with the horizontally extending upper wall 18 of the carrier 11, the ripper shank key assembly 19 is installed by manually manipulating the biased catch, in the form of a spring 35, to the condition shown by the dot-dash lines 35' of FIG. 3. With the spring 35 depressed to the position shown by dot-dash lines 35' the key is inserted downwardly until the offset portion 36 of the spring 35 is in position to engage with the top wall 18, then the spring 35 is merely released and the key assembly 19 will be maintained in a locked position and in turn the key assembly 19 will maintain the shank in a locked position since the shank cannot be withdrawn either upwardly or downwardly due to its notch 21 coacting with the upper wall 18.

Referring to the key assembly shown in detail in FIGS. 3 and 4, the body 38 of the key has a toe 39 which is tapered to facilitate installation and an enlarged head portion 41 with abutment surfaces 42 which prevent the key assembly from falling through the opening 17. The key assembly body 38 has a hollow interior into which the spring 35 is pocketed. This hollow portion is formed by side walls 46, 47, a bottom wall 48 and a top wall 49. The spring is made of a single piece of spring steel wire with the coils 51, 52 formed on the ends, respectively, of the spring steel wire. The ends of the catch 35 terminate in thrust transmitting portions 53 which bear against the bottom wall 48. A roll pin 55 extends through the coils 51, 52 for hinging the catch 35 and is press fit into bores 56, 57 formed in the key body 38. Lugs 61 are formed on the key body 38 to prevent the spring from rotating clockwise as viewed in FIG. 3 beyond the position shown in that figure. This serves to maintain the key assembly in a compact form when removed from the carrier 11.

It is seen that the key assembly illustrated is of sufficient vertical dimension to permit installation of a fairly long spring biased catch within the internal cavity defined by walls 46, 47, 48, 49. The coil spring segments of the spring biased catch are disposed at the bottom end of the cavity thereby giving the maximum amount of swing to the locking portion 36 of the spring 35. When the spring is manually depressed to the position shown in 35', the abutment or locking segment 36 of the spring and the other portions of the spring within the carrier will clear the opening 17 when the key assembly is withdrawn from its installed position. Preferably the spring is disposed completely within the cavity when the spring is deformed to its position shown in 35', except for the portion extending above the upper wall 18 of the carrier. The upper wall 49 of the cavity serves to prevent dirt and small rocks from lodging in the cavity which would make it difficult to manually depress the catch 35. By having the cavity open at front and rear the likelihood of dirt and rocks preventing disengagement of the catch is lessened.

Although only one embodiment of this invention has been illustrated, it is not intended to limit this invention except as necessitated by the scope of the appended claims.

What is claimed is:

1. In a ripper including a carrier having surfaces defining a vertical opening for receiving a ripper shank, a ripper shank disposed in said vertical opening, cooperating abutment surfaces on said carrier and shank for preventing relative vertical movement between said shank and carrier, a key assembly comprising: a key body having a lower end extending into said opening and having an enlarged head portion at its upper end extending beyond said opening, said lower end presenting a cavity opening to the rear face thereof, a manually operable catch disposed within said cavity and biased rearwardly, and a locking portion formed on said catch for cooperative engagement with said carrier to prevent withdrawal of said key therefrom, said catch being attached to said body to form an assembly therewith and being manually movable to a nonlocking position permitting removal of said key assembly.

2. In combination with a ripper including a carrier having a vertical opening, a ripper shank in said opening and horizontal abutment surfaces on said shank and carrier, respectively, for preventing relative vertical movement therebetween, a ripper shank key assembly comprising: a body disposed in said opening between said carrier and shank for maintaining said surfaces in abutting relation to one another, walls defining a cavity within said body, and a resilient catch connected to said body and disposed within said cavity, said catch having a locking portion cooperating with said carrier and said catch being manually movable to disengage said locking portion from said carrier thereby permitting withdrawal of said key assembly which in turn permits removal of said shank from said carrier.

3. In combination with a ripper having a carrier with a vertical opening for receiving a ripper shank and cooperating abutment surfaces on said shank and carrier for preventing withdrawal of said shank, a ripper shank key assembly comprising: an elongated body portion positionable within said opening between said shank and carrier, walls forming a cavity within said body, a spring catch connected to said body and including a locking portion manually movable from a locking position in which it prevents removal of said key assembly from said opening to a nonlocking position in which said locking portion is disposed within said cavity and said key assembly may be removed from said opening, and a portion of said catch extending to the exterior of said carrier when said key assembly is installed in said opening permitting manual manipulation of said catch.

4. In combination with a ripper having a carrier with a vertical opening for receiving a ripper shank and cooperating abutment surfaces on said shank and carrier for preventing withdrawal of said shank, a ripper shank key assembly comprising a vertically elongated body disposed within said opening and having walls defining a cavity, a spring catch pivotally secured to said body at the bottom of said cavity, said catch being biased in a direction away from said cavity and presenting a locking portion projecting outside said cavity into locking engagement with said carrier, said catch being manually pivotable to an installing position in which the portion of said catch within said opening in the installed condition of said key assembly does not protrude from said cavity.

5. The structure set forth in claim 4 and further comprising an abutment formed on said body of said key assembly preventing pivotal movement of said catch in the direction away from said cavity beyond its position of locking engagement with said carrier.

References Cited in the file of this patent

UNITED STATES PATENTS

| | | |
|---|---|---|
| 363,640 | Howard | May 24, 1887 |
| 782,717 | Blaine | Feb. 14, 1905 |
| 906,693 | Cook | Dec. 15, 1908 |
| 978,687 | Blaine | Dec. 13, 1910 |
| 1,091,447 | Wagner | Mar. 24, 1914 |